(12) United States Patent
Holman et al.

(10) Patent No.: US 10,949,469 B2
(45) Date of Patent: Mar. 16, 2021

(54) OBTAINMENT AND DISPLAY OF REAL-TIME INFORMATION FOR A SET OF BLOCK-FACES

(71) Applicant: Verizon Patent and Licensing Inc., Arlington, VA (US)

(72) Inventors: Sean Holman, Palo Alto, CA (US); Megan M. Latta, Louisville, CO (US); Matthew Wickman, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 394 days.

(21) Appl. No.: 15/829,614

(22) Filed: Dec. 1, 2017

(65) Prior Publication Data
US 2019/0065628 A1    Feb. 28, 2019

Related U.S. Application Data
(60) Provisional application No. 62/550,275, filed on Aug. 25, 2017.

(51) Int. Cl.
| | |
|---|---|
| *G06F 16/9038* | (2019.01) |
| *G06F 3/0481* | (2013.01) |
| *G06F 16/29* | (2019.01) |
| *G06F 16/58* | (2019.01) |
| *G06F 16/9535* | (2019.01) |
| *G06T 11/00* | (2006.01) |

(52) U.S. Cl.
CPC ........ *G06F 16/9038* (2019.01); *G06F 3/0481* (2013.01); *G06F 16/29* (2019.01); *G06F 16/5866* (2019.01); *G06F 16/9535* (2019.01); *G06T 11/001* (2013.01)

(58) Field of Classification Search
None
See application file for complete search history.

(56) References Cited

U.S. PATENT DOCUMENTS

| | | | |
|---|---|---|---|
| 7,516,010 B1 * | 4/2009 | Kaplan | G01C 21/30 701/426 |
| 10,354,531 B1 * | 7/2019 | Bronder | G08G 1/144 |
| 2010/0007525 A1 * | 1/2010 | Shanbhag | G08G 1/14 340/932.2 |

(Continued)

OTHER PUBLICATIONS

Physical vs Virtual server, Dec. 26, 2016 by Jeff Wilson, https://www.rosehosting.com/blog/physical-server-vs-virtual-server-all-you-need-to-know/ (Year: 2016).*

*Primary Examiner* — Hau H Hoang (57) ABSTRACT

A device can receive parking information for a set of street segments within a geographic region. The parking information can include metadata for a set of parking spaces within the set of street segments. The device can create a set of block-face objects that represent block-faces within the set of street segments. The device can generate a data structure that associates the parking information for the set of street segments with the set of block-face objects. The device can receive, from a user device, a request for parking information associated with a geographic area. The device can obtain the parking information associated with the geographic area by using location information included in the request to search the data structure. The device can provide the parking information associated with the geographic area for display on a user interface of the user device.

20 Claims, 7 Drawing Sheets

(56) References Cited

U.S. PATENT DOCUMENTS

| | | | | |
|---|---|---|---|---|
| 2013/0211699 A1* | 8/2013 | Scharmann | ............ | G01C 21/32 |
| | | | | 701/117 |
| 2013/0257632 A1* | 10/2013 | Harber | ................ | G08G 1/0112 |
| | | | | 340/932.2 |
| 2015/0379873 A1* | 12/2015 | Tippelhofer | ........... | G08G 1/143 |
| | | | | 340/932.2 |
| 2017/0316690 A1* | 11/2017 | Charles | ................. | G08G 1/144 |
| 2018/0053417 A1* | 2/2018 | Rolf | ..................... | H04W 4/024 |

* cited by examiner

OBTAINMENT AND DISPLAY OF REAL-TIME INFORMATION FOR A SET OF BLOCK-FACES

BACKGROUND

Geolocation is the identification or estimation of the real-world geographic location of an object, such as a vehicle, a mobile phone, a person, or the like. A device can identify or estimate a geolocation of an object by determining a set of geographic coordinates associated with a location of the object.

DETAILED DESCRIPTION OF PREFERRED EMBODIMENTS

The following detailed description of example implementations refers to the accompanying drawings. The same reference numbers in different drawings can identify the same or similar elements.

Geographic map data can be used to make vehicle navigation decisions. For example, a user device can provide a request for a set of navigational directions that includes an original location and a destination location. The user device can receive and provide, for display, a set of directions to travel from the origination location to the destination location. However, applications that provide navigational directions might not provide the user device with related services that improve the user experience. For example, an application providing navigational directions can direct the user device to the destination location, but the user device might need to continue to drive around to search for available parking.

Some implementations described herein provide a location management platform to generate a data structure that associates parking information for a set of street segments with a set of block-face objects, and uses the data structure to provide a user device with a service that identifies available parking spaces. For example, a location management platform can receive, from a set of reporting devices, parking information for a set of street segments within a geographic region. In this case, the location management platform can generate a data structure that associates the parking information with a set of block-face objects.

Additionally, the location management platform can receive, from a user device, a request for parking information associated with a geographic area (e.g., an area within the geographic region). In this case, the location management platform can search the data structure to obtain the parking information associated with the geographic area. Furthermore, the location management platform can provide the parking information associated with the geographic area for display on a user interface of the user device.

In this way, the location management platform provides the user device with a service that identifies available parking spaces in real-time (e.g., real-time relative to a last time that the data structure is updated). Additionally, by servicing requests from the user device with the data structure, the location management platform conserves processing resources relative to querying the parking information from ground-level reporting devices in real-time. Furthermore, by allowing users to quickly identify available parking, less gas is expended by vehicles of the users, traffic congestion is reduced, and the overall user experience is improved.

FIGS. 1A-1D are diagrams of an overview of an example implementation 100 described herein. As shown in FIGS. 1A-1D, a location management platform can generate a data structure that associates parking information for a set of street segments with a set of block-face objects. Additionally, the location management platform can use the data structure to provide a user device with a parking service that identifies available parking spaces in a geographic area.

Figure 1A:
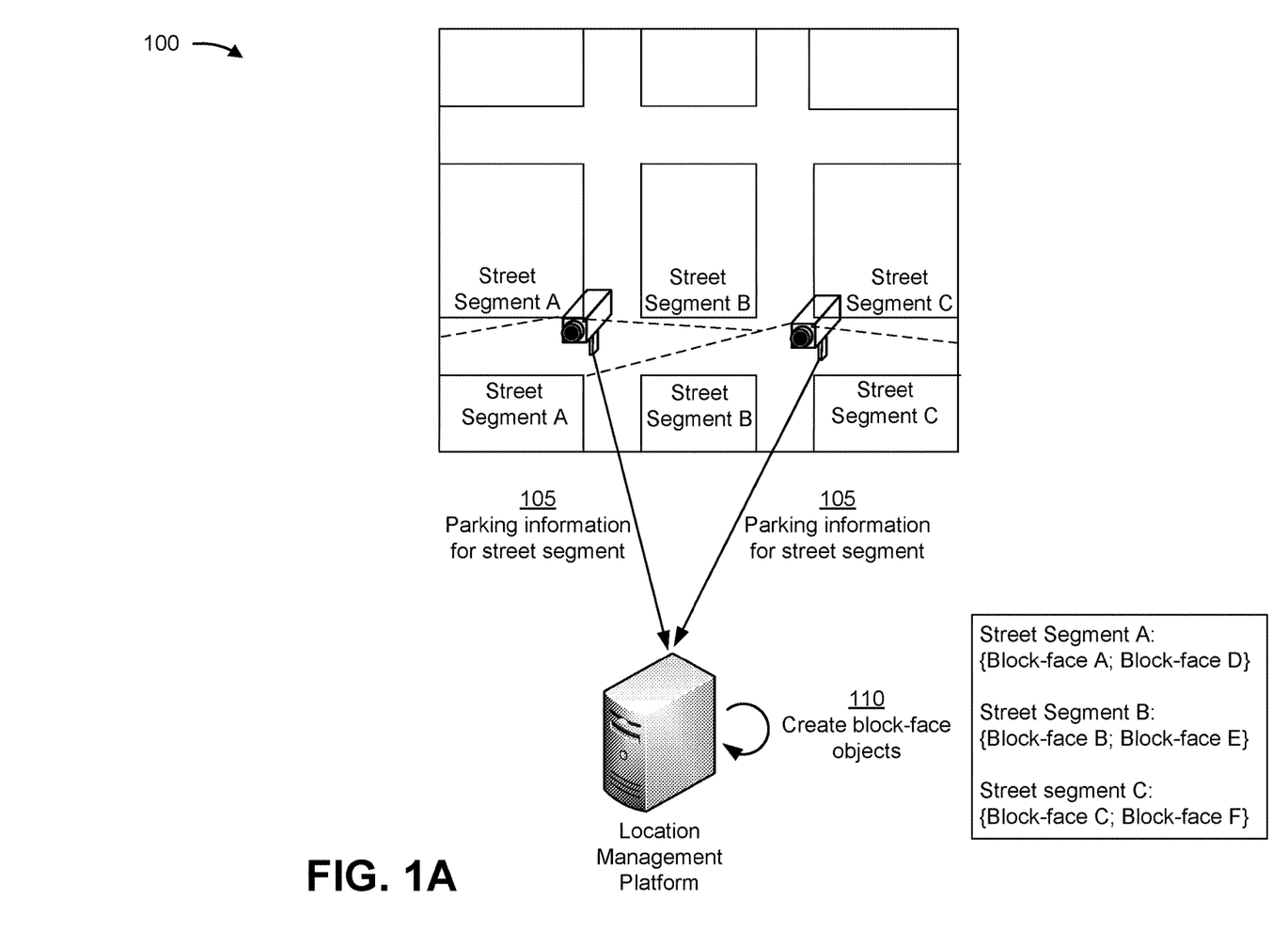
FIGS. 1A-1D are diagrams of an overview of an example implementation described herein.

As shown in FIG. 1A, and by reference number 105, the location management platform can receive, from a set of reporting devices (shown in example implementation 100 as cameras), parking information for the set of street segments in a geographic region. For example, the location management platform can receive parking information that includes metadata for a set of parking spaces located within the set of street segments. A street segment can be a geographic area between two intersections. In this case, the set of reporting devices can monitor the set of street segments to collect the metadata, and can provide the metadata to the location management platform for further processing.

The metadata can include, for example, a metadata value indicating a geographic location of a particular parking space (which can be used to determine a size of the particular parking space), a metadata value indicating whether a particular parking space is available, a metadata value indicating a timestamp, a metadata value indicating whether a particular parking space is associated with a handicap designation or is metered, and/or the like.

Additionally, the set of reporting devices can periodically provide the parking information to the location management platform. For example, the set of reporting devices can be configured to provide the metadata at particular intervals (e.g., every second, every five seconds, every minute, etc.). In this way, when the location management platform processes the parking information, the location management platform is able to process parking information that is real-time or near real-time (e.g., because the parking information is updated to the second, to the minute, etc.).

Shown as an example, two reporting devices can provide metadata associated with street segment A, street segment B, and street segment C. In practice, the set of reporting devices can include thousands of reporting devices, even millions of reporting devices, and can provide metadata for street segments within a large geographic region, such as a state or a country.

As shown by reference number 110, the location management platform can create a set of block-face objects that represent block-faces within the set of street segments. A block-face can represent a side of a street between two intersections. In this case, the location management platform can create a block-face object by defining an object using one or more sets of geographic coordinates. In some cases, the location management platform can create a first block-face for a first side of a street within a street segment, and can create a second block-face for a second side of the street within the street segment.

As shown as an example, the location management platform can create two block-face objects per street segment, such that each side of a particular street segment is associated with a block-face object. In this case, street segment A can include block-face A and block-face D, street segment B can include block-face B and block-face E, and street segment C can include block-face C and block-face F. A visualization of the block-faces can be found in FIG. 1C.

In this way, the location management platform is able to receive parking information street segments and is able to create block-face objects that can be used to generate a data structure, as described herein.

Figure 1B:
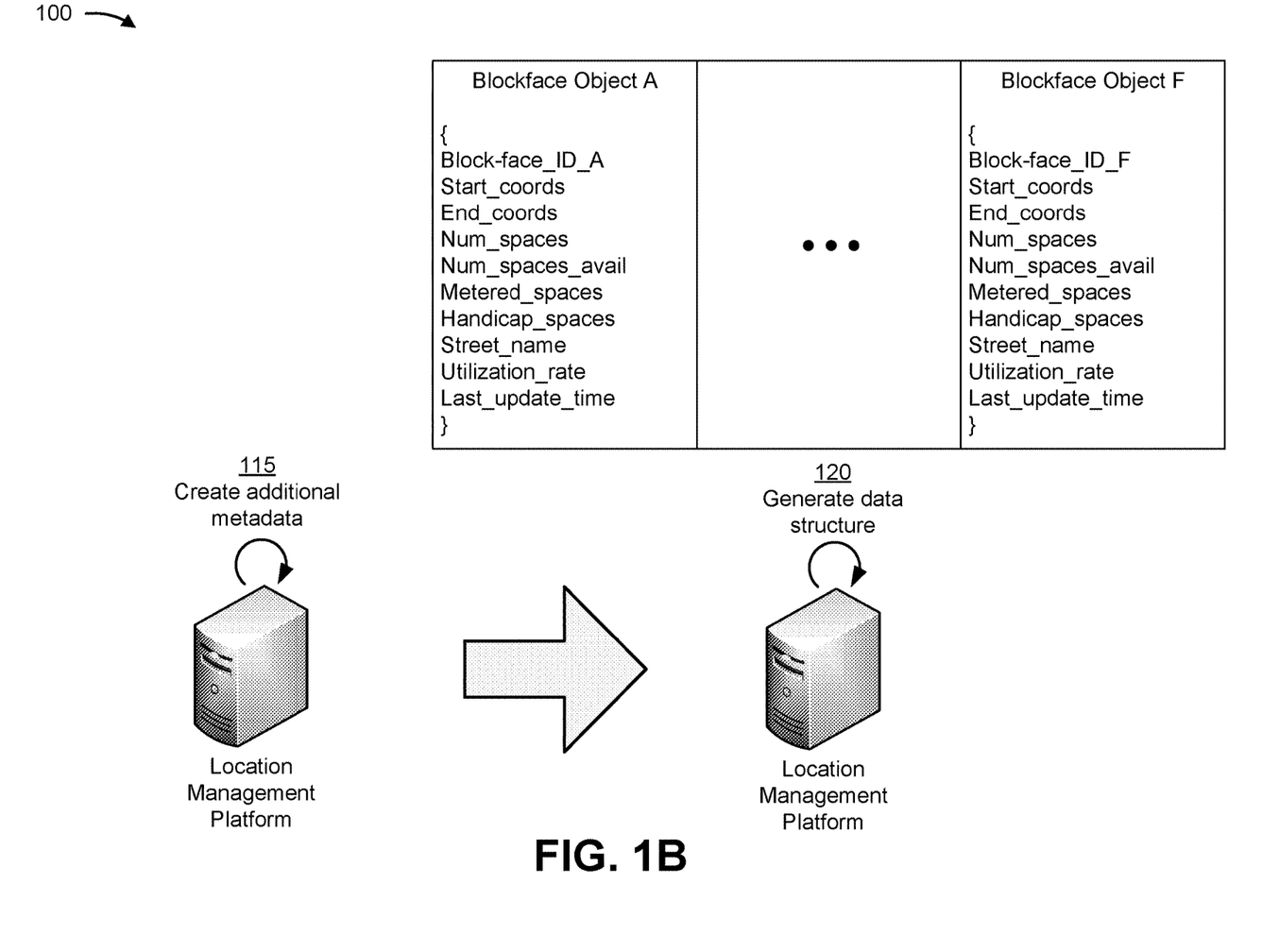

As shown in FIG. 1B, and by reference number 115, the location management platform can create additional metadata that is associated with particular block-faces. For example, the location management platform can sort the metadata associated with the set of street segments into a group for each block-face, and can analyze metadata associated with each group to determine additional metadata associated with each block-face. The additional metadata associated with a block-face can include a metadata value indicating a total number of parking spaces associated with a particular block-face, a metadata value indicating a total number of available parking spaces associated with a particular block-face, and/or the like.

In some implementations, the location management platform can generate additional metadata using a forecasting technique. For example, assume that the set of reporting devices are unable to obtain parking information for "dead zones" (i.e., zones that the sensors cannot reach). In this case, the location management platform can analyze the metadata for the set of street segments using a forecasting technique to determine additional metadata for the dead zones, and can associate the additional metadata for the dead zones with block-face objects using the data structure. In other cases, vehicles or sensors associated with vehicles can serve as reporting devices to ensure that the location management platform obtains metadata for all portions of the sets of street segments.

As shown by reference number 120, the location management platform can generate a data structure. For example, the location management platform can generate a data structure that associates the metadata and the additional metadata with the set of block-face objects. As shown as an example, the data structure can associate a block-face object with a metadata value indicating a block-face identifier, metadata values defining the geographic area of a block-face (shown as "start_coords" and "end_coords"), a metadata value indicating a number total number of parking spaces within the block-face, a metadata value indicating a total number of available parking spaces, a metadata value indicating whether particular parking spaces are metered spaces or handicap spaces, a metadata value indicating a street name, a metadata value indicating a utilization rate (e.g., a turnover rate for a particular parking space), a metadata value indicating a last time that the data structure has been updated, and/or the like.

In this way, the location management platform is able to generate a data structure that can be used to provide the user device with parking information for a geographic area.

Figure 1C:
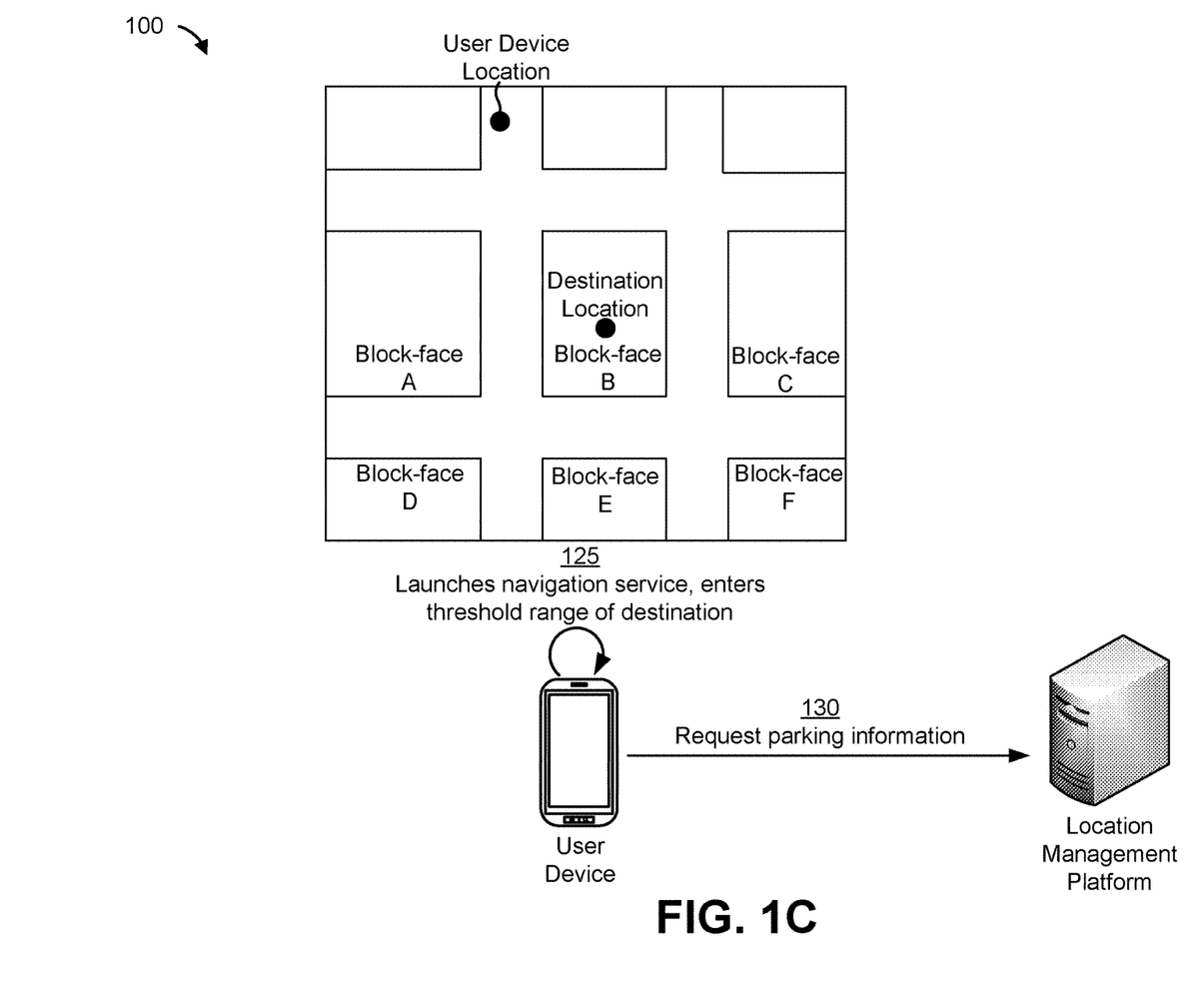

As shown in FIG. 1C, and by reference number 125, the user device can launch a navigation service to request a set of navigational directions. Additionally, the user device can use the set of navigational directions to travel toward a destination location, and can enter into a threshold range of the destination location.

As shown by reference number 130, the user device can provide, to the location management platform a request for parking information associated with a geographic area. For example, the navigation service can be configured to detect when the user device is within the threshold range of the destination location, which can trigger the user device to provide a request for parking information to the location management platform. In this case, the request can include information indicating a current location of the user device, information indicating the destination location, information indicating a radius or area around the destination, and/or the like.

In this way, the user device is able to provide a request to the location management platform for parking information associated with a geographic area.

Figure 1D:
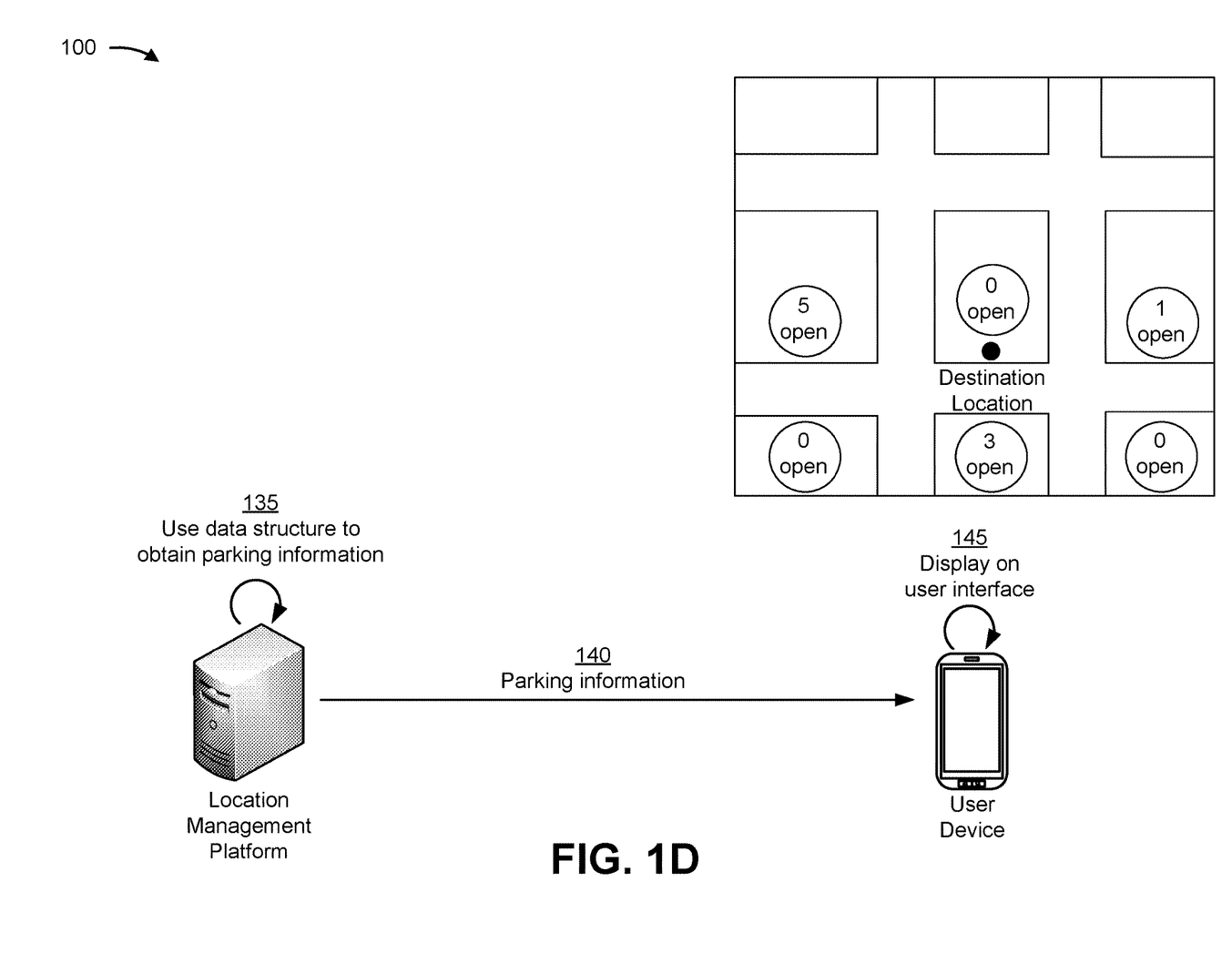

As shown in FIG. 1D, and by reference number 135, the location management platform can use the data structure to obtain the parking information associated with the geographic area. For example, the location management platform can search (e.g., query) the data structure using the destination location of the user device to obtain metadata and/or additional metadata for one or more block-faces in the vicinity of the destination location.

As shown by reference number 140, the location management platform can provide the parking information associated with the geographic area to the user device. For example, the location management platform can provide, for block-faces A, B, C, D, E, and F, a value indicating a total number of available parking spaces, a value indicating a range of available parking spaces, a value indicating a utilization rate, and/or the like.

As shown by reference number 145, the user device can display the parking information on a user interface. For example, the user device can display the on the user interface the total number of parking spaces that are available for each block-face, the ranges of available parking spaces, the utilization rate for each block-face, and/or the like.

In some implementations, the user device can display, on the user interface, a colored representation of one or more block-faces in a threshold around the user device. For example, the user interface can display different colored markings (e.g., red, yellow, green, etc.) on the user interface to provide an indication of a threshold number of available parking spaces (e.g., a red marking can be associated with zero to two available parking spaces, a yellow marking can be associated with two to four available parking spaces, a green marking can be associated with five or more available parking spaces, etc.).

Additionally, or alternatively, the user device subscribe to the one or more block-faces, and the user interface can display updates relating to parking information in the vicinity of the destination location. For example, the navigation service can be configured to automatically subscribe the user device to the one or more block-faces when the user device enters the threshold area within the destination location. In this case, the location management platform can provide periodic updates regarding a current status of parking availability in the vicinity of the destination location.

In this way, the location management platform is able to use the data structure to provide the user device with real-time parking information. Furthermore, the location management platform conserves processing resources that might otherwise be used to calculate a new set of navigational directions. For example, without the parking service, the user device might reach the destination location, realize there is no available parking spaces, and input navigational directions to a nearby parking garage. By providing the user device with a real-time display of parking information, the location management platform conserves processing resources by avoiding these additional navigation queries.

As indicated above, FIGS. 1A-1D are provided merely as examples. Other examples are possible and can differ from what was described with regard to FIGS. 1A-1D.

Figure 2:
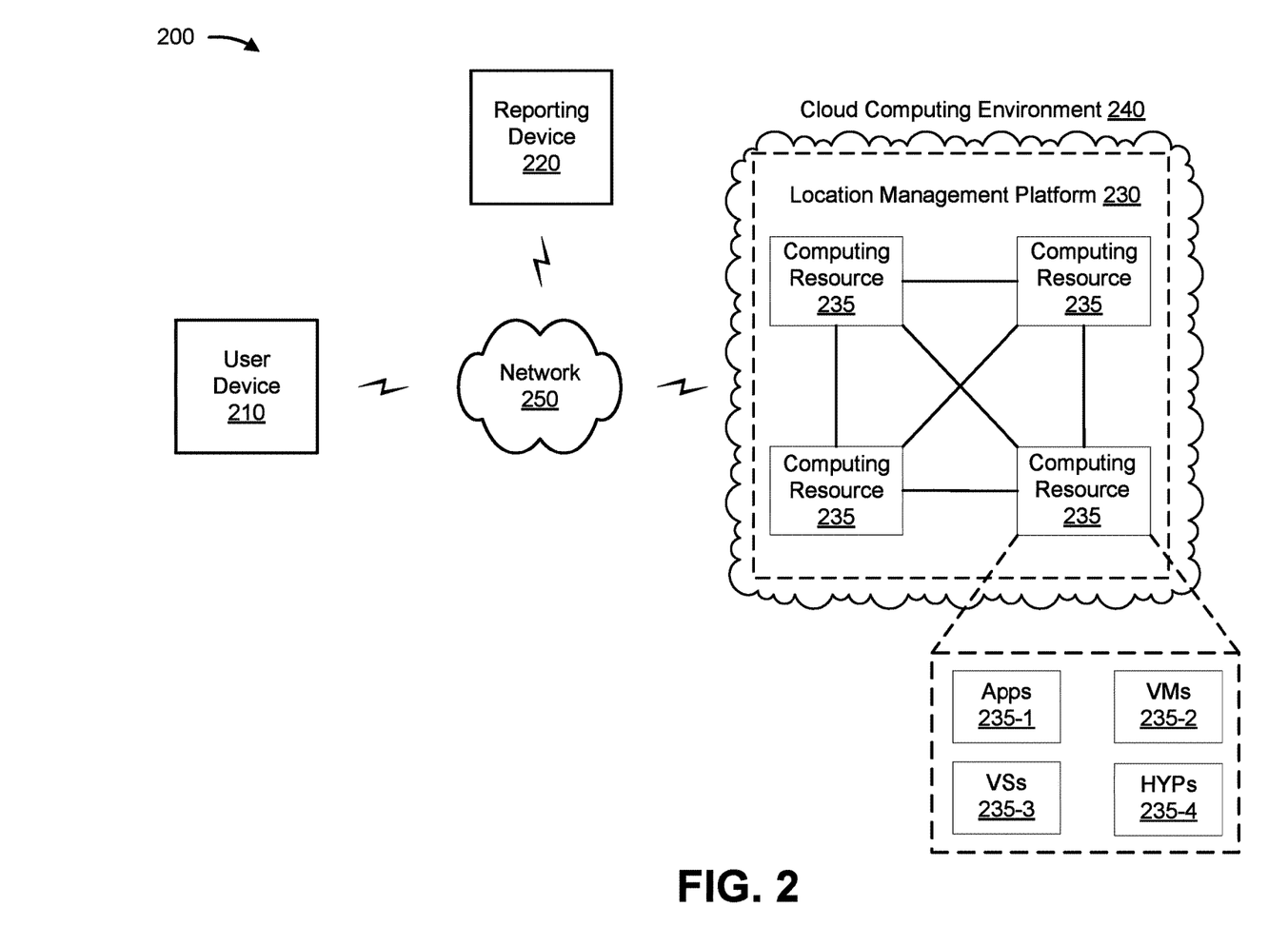
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a reporting device 220, a location management platform 230 hosted within a cloud computing environment 240, and/or a network 250. Devices of environment 200 can interconnect via wired connections, wireless connections, or a combination of wired and wireless connections.

User device 210 includes one or more devices capable of receiving, storing, generating, processing, and/or providing parking information. For example, user device 210 can include a communication and/or computing device, such as a phone (e.g., a mobile phone, such as a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 can provide a request for parking information to location management platform 230. In some implementations, user device 210 can receive the parking information from location management platform 230, and can provide the parking information for display on a user interface. In some implementations, communications between user device 210 and location management platform 230 can be made using an application programming interface (API).

Reporting device 220 includes one or more devices capable of receiving, storing, generating, processing, and/or providing parking information for a set of street segments. For example, reporting device 220 can include a sensor, such as, for example, a camera, a sensor located at an intersection, a vehicle sensor, a sensor affixed to a drone, a weighting mechanism, such as an inductive loop capable of detecting the presence of a vehicle, a sensor capable of detecting weight or vehicle length, a pneumatic tube counting device, and/or the like. In some implementations, reporting device 220 can be located at a fixed location (e.g., such as on a street or at an intersection) or at a mobile location (such as attached to a satellite, a vehicle, a drone, etc.). In some implementations, reporting device 220 can collect metadata for a set of street segments. In some implementations, reporting device 220 can provide the metadata for the set of street segments to location management platform 230.

Location management platform 230 includes one or more devices capable of receiving, storing, generating, processing, and/or providing parking information. For example, location management platform 230 can include a server device (e.g., a host server, a web server, an application server, etc.), a data center device, or a similar device.

In some implementations, as shown, location management platform 230 can be hosted in cloud computing environment 240. Notably, while implementations described herein describe location management platform 230 as being hosted in cloud computing environment 240, in some implementations, location management platform 230 might not be cloud-based (i.e., can be implemented outside of a cloud computing environment) or might be partially cloud-based.

Cloud computing environment 240 includes an environment that hosts location management platform 230. Cloud computing environment 240 can provide computation, software, data access, storage, and/or other services that do not require end-user knowledge of a physical location and configuration of system(s) and/or device(s) that host location management platform 230. As shown, cloud computing environment 240 can include a group of computing resource 235 (referred to collectively as "computing resources 235 and individually as "computing resource 235").

Computing resource 235 includes one or more personal computers, workstation computers, server devices, or another type of computation and/or communication device. In some implementations, computing resource 235 can host location management platform 230. The cloud resources can include compute instances executing in computing resource 235, storage devices provided in computing resource 235, data transfer devices provided by computing resource 235, etc. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that can be provided to or accessed by user device 210. Application 235-1 can eliminate a need to install and execute the software applications on user device 210. For example, application 235-1 can include software associated with location management platform 230 and/or any other software capable of being provided via cloud computing environment 240. In some implementations, one application 235-1 can send/receive information to/from one or more other applications 235-1, via virtual machine 235-2.

Virtual machine 235-2 includes a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program, and can support a single process. In some implementations, virtual machine 235-2 can execute on behalf of a user (e.g., user device 205), and can manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 can include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
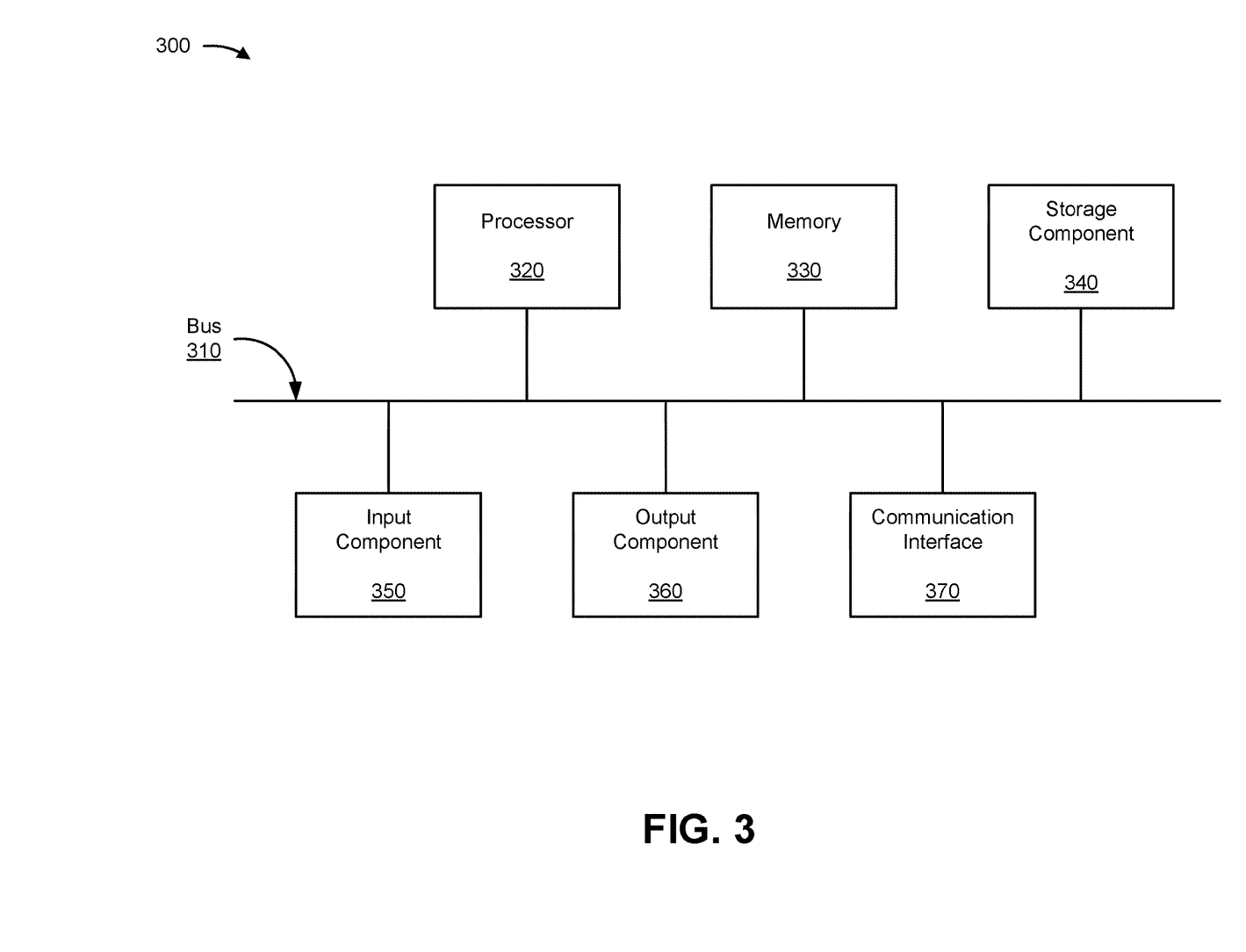
FIG. 3 is a diagram of example components of one or more devices of FIG. 2.

FIG. 3 is a diagram of example components of a device 300. Device 300 can correspond to user device 210, reporting device 220, and/or location management platform 230. In some implementations, user device 210, reporting device 220 and/or location management platform 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
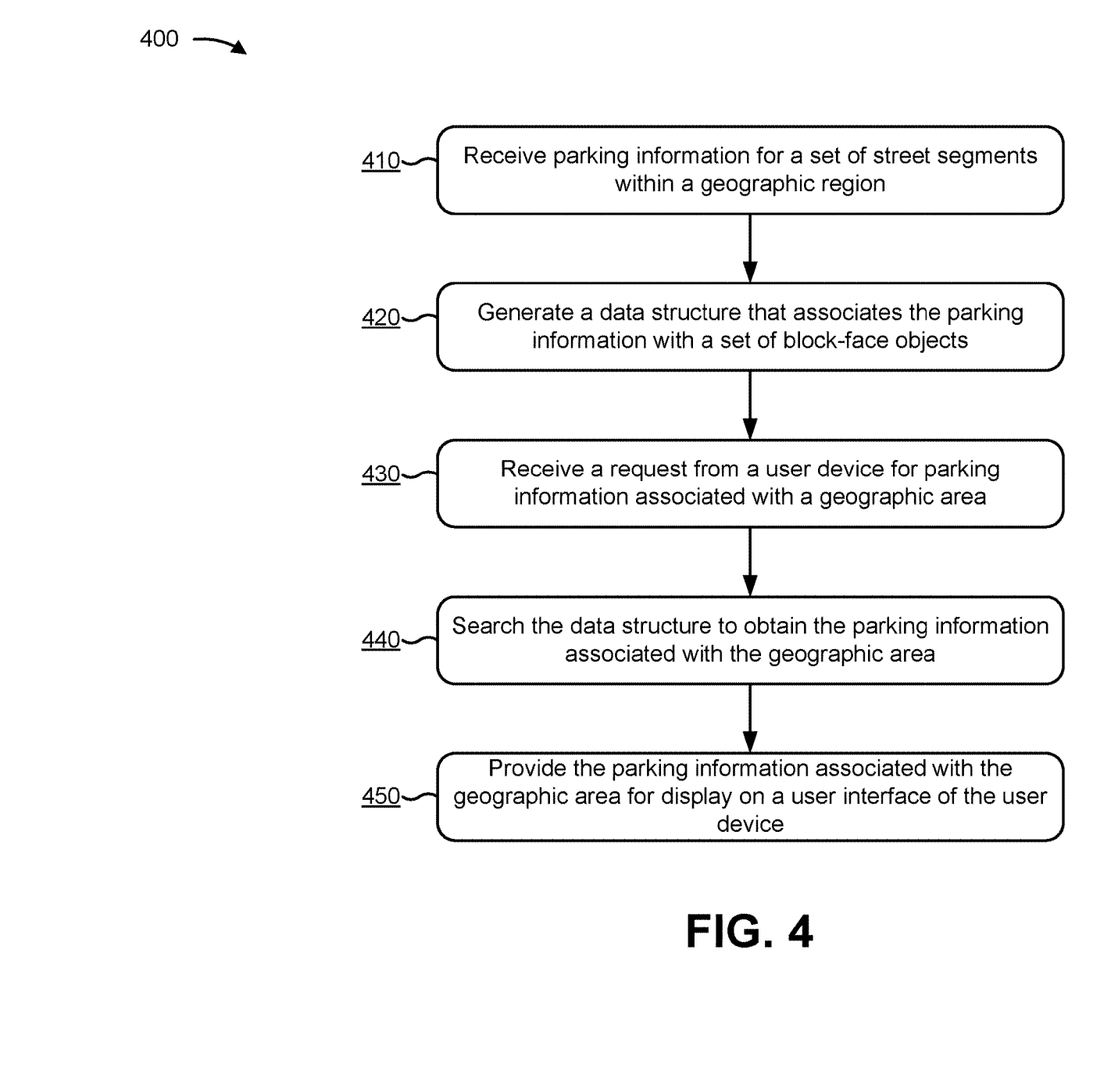
FIG. 4 is a flow chart of an example process for generating a data structure that can be used to provide real-time parking information for display on a user interface of a user device.

FIG. 4 is a flow chart of an example process 400 for generating a data structure that can be used to provide real-time parking information for display on a user interface of a user device. In some implementations, one or more process blocks of FIG. 4 can be performed by location management platform 230. In some implementations, one or more process blocks of FIG. 4 can be performed by another device or a group of devices separate from or including location management platform 230, such as user device 210 and/or reporting device 220.

As shown in FIG. 4, process 400 can include receiving parking information for a set of street segments within a geographic region (block 410). For example, location management platform 230 can receive, from a set of reporting devices 220, parking information that includes metadata for a set of parking spaces within the set of street segments. A street segment can be a geographic area between two interactions. The metadata for the set of parking spaces can include a metadata value indicating a geographic location of a particular parking space, a metadata value indicating whether a particular parking space is available, a metadata value indicating a timestamp, a metadata value indicating whether a particular parking space is handicap, a metadata value indicating whether a particular parking space is metered, a metadata value indicating whether construction is inhibiting one or more parking spaces, and/or the like.

In some implementations, location management platform 230 can receive parking information associated with a street segment. For example, one or more reporting devices 220 (e.g., video nodes located at street intersections) can monitor the street segment during an interval. In this case, the one or more reporting devices 220 can collect parking information, and can provide the parking information to location management platform 230.

As an example, the one or more reporting devices 220 can determine a total number of parking spaces on each side of the street by identifying geographic locations of vehicles that park on the street during the interval. Additionally, or alternatively, the one or more reporting devices 220 can determine a total number of parking spaces on each side of the street by identifying painted markings of particular parking spaces, parking meters, parking signs (e.g., handicap signs), identifying distances between vehicles, and/or the like.

In some implementations, location management platform 230 can receive parking information for the set of street segments from another data source. For example, location management platform 230 can receive parking information for the set of street segments from another data source by querying and/or analyzing information provided by the other data source. In this case, location management platform 230 can analyze the information provided by the other data source by using a data mining technique, a natural language processing technique, or the like, to identify and obtain parking information for the set of street segments.

In some implementations, location management platform 230 can periodically receive the parking information. For example, the set of reporting devices 220 can be configured to provide the parking information at particular intervals (e.g., every second, every five seconds, every minute, etc.). In this way, when location management platform 230 processes the parking information, location management platform 230 is able to process parking information that is real-time or near real-time (e.g., because the parking information is updated to the second, to the minute, etc.).

In this way, location management platform 230 is able to receive parking information for a set of street segments.

As further shown in FIG. 4, process 400 can include generating a data structure that associates the parking information with a set of block-face objects (block 420). For example, location management platform 230 can create a set of block-face objects, and can generate a data structure that associates the parking information for the set of street segments with the set of block-face objects. Additionally, location management platform 230 can create additional metadata for the set of street segments, and can associate the additional metadata with the set of block-face objects. A block-face object can represent a block-face, which is a side of a street between two intersections. A block-face can be defined by two or more sets of geographic coordinates.

In some implementations, location management platform 230 can create a block-face object. For example, location management platform 230 can create a block-face object by associating location information (e.g., two or more sets of geographic coordinates) with a block-face object identifier. In some cases, location management platform 230 can associate location information and with a block-face object identifier by analyzing the metadata associated with the set of street segments. In other cases, location management platform 230 can associate location information with a block-face object identifier by analyzing additional data sources (e.g., publicly available webpages that include location information).

In some implementations, location management platform 230 can create a set of block-face objects for the set of street segments. For example, location management platform 230 can create a block-face object for each side of a street for each street segment. In this case, a street segment can be associated with two block-face objects.

In some implementations, location management platform 230 can generate a data structure. For example, location management platform 230 can generate a data structure, such as a graph, a table, a linked-list, an array, a hash table, a tree, a database, and/or the like. In this case, location management platform 230 can store large quantities of data (e.g., hundreds of thousands, millions, billions, etc. of data points), such that a human operator or an inferior cloud service might be objectively unable to store and/or process.

In some implementations, location management platform 230 can use the data structure to establish an association between the parking information for the set of street segments and the set of block-faces. For example, location management platform 230 can use the data structure to establish an association between metadata for a parking space and a block-face identifier of a block-face object. In this case, the association can be based on the parking space being located with a geographic area of the block-face object.

In some implementations, location management platform 230 can sort the metadata associated with the set of parking spaces based on the set of block-face objects. For example, location management platform 230 can sort the metadata associated with the set of street segments such that the metadata is grouped based on block-face objects. As an example, location management platform 230 can analyze the information identifying geographic locations of particular parking spaces, such that each parking space is associated with a particular block-face object.

In some implementations, location management platform 230 can determine additional metadata for a block-face object. For example, location management platform 230 can analyze the metadata associated with the set of street segments to determine additional metadata for a block-face object. As an example, location management platform 230 can analyze metadata indicating particular parking spaces and the metadata indicating availability of particular parking spaces to determine a total number of parking spaces and a total number of available parking spaces.

In some implementations, location management platform 230 can generate additional metadata using a forecasting technique. For example, location management platform 230 can generate additional metadata for a portion of the set of street segments that is not reportable by reporting devices 220. In this case, location management platform 230 can analyze the metadata for the set of street segments using a forecasting technique to determine additional metadata for the dead zones, and can associate the additional metadata for the dead zones with block-face objects using the data structure.

In this way, location management platform 230 is able to generate a data structure that associates the parking information with the set of block-face objects.

As further shown in FIG. 4, process 400 can include receiving a request from a user device for parking information associated with a geographic area (block 430). For example, location management platform 230 can receive, from user device 210, a request for parking information associated with a geographic area. The request can include location information identifying a location of user device 210, location information identifying a threshold area around the location of user device 210, location information identifying a destination location, location information identifying a threshold area around the destination location, information associated with one or more user preferences (e.g., a user can require handicap parking, can request parking information only for non-metered spaces, etc.), and/or the like.

In some implementations, location management platform 230 can receive a request for parking information as part of a set of navigational directions for a user. For example, assume a user interacts with user device 210 to input a set of navigational directions. In this case, location management platform 230 can receive a request for parking information, such that the parking information can be displayed on a user interface of user device 210 as part of the navigational directions, as described further herein.

In some implementations, location management platform 230 can receive a request for parking information when user device 210 is in a threshold range of a destination location. For example, an application that is hosted on user device 210 and provides navigational directions as a service might be configured with a distance threshold. In this case, the distance threshold might trigger when user device 210 is within a threshold range of the destination location. Additionally, when the threshold is satisfied, user device 210 can provide the request for parking information to location management platform 230. In this way, user device 210 can only request parking information when user device 210 is close enough to a destination location for a user to have a need to view the parking information.

In this way, location management platform 230 is able to receive a request from user device 210 for parking information associated with a geographic area.

As further shown in FIG. 4, process 400 can include searching the data structure to obtain the parking information associated with the geographic area (block 440). For example, location management platform 230 can search (e.g., query) the data structure using information included in the request to obtain the parking information.

In some implementations, location management platform 230 can search the data structure using a location provided in the request. For example, the request for parking information can include a geographic location (e.g., a destination location of user device 210), and location management platform 230 can use the geographic location to search the data structure for parking information associated with one or more block-face objects in a vicinity of the geographic location. In some cases, the request can also indicate a radius around the geographic location, and location management platform 230 can obtain parking information for one or more block-face objects within the radius.

In some implementations, location management platform 230 can translate the parking information to a format capable of being displayed on a user interface. Alternatively, translation-layer functionality can be supported by user device 210.

In this way, location management platform 230 is able to obtain the parking information needed to satisfy the request of user device 210.

As further shown in FIG. 4, process 400 can include providing the parking information associated with the geographic area for display on a user interface of the user device (block 450). For example, location management platform 230 can provide the parking information for display on a user interface of user device 210 to allow a user to view a real-time number of available parking spaces (e.g., real-time relative to a last time that the data structure is updated).

In some implementations, user device 210 can display the parking information on a user interface. For example, user device 210 can display the parking information such that the user interface displays a number of available parking spaces in a vicinity of a geographic area (e.g., in a vicinity of a destination location of a set of navigational directions).

In some implementations, user device 210 can display, on the user interface, a set of colors (e.g., red, yellow, green, etc.) that are associated with threshold levels of available parking. For example, the user interface can display green for an area within a block-face if there are more than a threshold number of available parking spaces, or can display red for an area within a block-face if there are less than a threshold number of available parking spaces.

In some implementations, user device 210 can display, on the user interface, a utilization rate associated with a particular block-face. In this case, a user can view the utilization rate to determine a likelihood of a parking space becoming available if the user is to wait in the area.

In some implementations, user device 210 can display, on the user interface, a particular available parking space, and the navigational directions can automatically direct user device 210 to the available parking space. In some implementations, if no parking spaces are available, user device 210 can display, on the user interface, a parking space or an area that is most likely to become available (e.g., based on utilization rates, based on predictions made from forecasting models, etc.).

In some implementations, user device 210 (or the navigation service supported by user device 210) can be configured to subscribe to particular block-faces, and user device 210 can display, on the user interface, a notification when a parking space becomes available. For example, a user settings can be configured to automatically subscribe to particular block-faces when user device 210 is within a threshold distance of a destination location. In this case, if no parking spaces are available, user device 210 can subscribe to one or more block-faces, and can receive, and display on the user interface, a notification when a parking space is available.

In some implementations, user device 210 can display, on the user interface, one or more available parking spaces that satisfy a size parameter included in a user profile. For example, a user profile can include a size parameter where a user can input a size of the user's vehicle. In this case, location management platform 230 can receive, obtain, and provide, parking information for a geographic area to user device 210. Here, the parking information can include only available parking spaces with a vehicle size that is greater than the size parameter included in the user profile (e.g., greater than by a particular size, a threshold size, etc.).

In some implementations, user device 210 can display, on the user interface, one or more unavailable parking spaces.

For example, assume another user device 210 requests parking information for the same geographic. In this case, if the other user device 210 requests parking information prior to the request made user device 210, then user device 210 can display, on the user interface, that a parking space is unavailable if location management platform 230 has already assigned or allocated the parking space to the other user device 210.

In some implementations, user device 210 can display, on the user interface, parking information that includes additional metadata indicating a predicted number of available parking spaces. For example, as described elsewhere herein, reporting devices 220 might not be able to collect parking information for an entire street segment. In this case, location management platform 230 can use a forecasting technique to determine additional metadata for the areas of the street segment that are unable to be reported by reporting devices 220. Additionally, location management platform 230 can provide the additional metadata to user device to service a request, and user device 210 can display, on the user device, the parking information that includes the metadata indicating the predicted number of available parking spaces. In some cases, user device 210 can display, on the user interface, prediction information that identifies an area associated with a block-face that has a highest probability of having parking.

In this way, location management platform 230 can provide the parking information associated with the geographic area for display on a user interface.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, location management platform 230 provides user device 210 with a service that identifies available parking spaces in real-time (e.g., real-time relative to a last time that the data structure is updated). Additionally, by servicing requests from user device 210 with the data structure, location management platform 230 conserves processing resources relative to querying the parking information from ground-level reporting devices in real-time. Furthermore, by allowing users to quickly identify available parking, less gas is expended by vehicles of the users, traffic congestion is reduced, and the overall user experience is improved.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and one or more processors, operatively coupled to the memory and at least partially implemented in hardware, to:
receive parking information for a set of street segments within a geographic region,
the parking information including metadata for a set of parking spaces within the set of street segments, and
wherein the one or more processors, when receiving the parking information for the set of street segments, are to:
receive metadata for a portion of a first street segment, of the set of street segments, from a set of reporting devices, and
receive no metadata for another portion of the first street segment from the set of reporting devices;
create a set of block-face objects that represent block-faces within the set of street segments;
generate a data structure that associates the parking information for the set of street segments with the set of block-face objects;
execute a forecasting technique to determine metadata for the other portion of the first street segment for which no metadata was received;
use the data structure to associate the metadata for the portion of the first street segment and the metadata for the other portion of the first street segment for which no metadata was received with one or more block-face identifiers associated with the first street segment;
receive a request from a user device for parking information associated with a geographic area,
the request including at least one of:
location information identifying a location of the user device,
location information identifying a threshold area around the location of the user device,
location information identifying a destination location, or
location information identifying a threshold area around the destination location;
obtain the parking information associated with the geographic area by using location information included in the request to search the data structure; and
provide the parking information associated with the geographic area for display on a user interface of the user device.

2. The device of claim 1, where the metadata for a street segment of the set of street segments includes at least one of:
a metadata value indicating a geographic location of a particular parking space,
a metadata value indicating whether the particular parking space is available,
a metadata value indicating a timestamp,
a metadata value indicating whether the particular parking space is associated with a handicap designation, or
a metadata value indicating whether the particular parking space is metered.

3. The device of claim 1, where the one or more processors, when generating the data structure that associates the parking information for the set of street segments with the set of block-face objects, are to:
establish an association between metadata for a parking space of the set of parking spaces and a block-face identifier associated with a block-face object of the set of block-face objects,
where the association is based on the parking space being located within a geographic area of the block-face object, and
include the association in the data structure.

4. The device of claim 1, where the one or more processors, when generating the data structure that associates the parking information for the set of street segments with the set of block-face objects, are to:
analyze the metadata for the set of parking spaces to create additional metadata,
the additional metadata including:
a metadata value indicating a total number of parking spaces associated with a particular block-face, and
a metadata value indicating a total number of available parking spaces associated with a particular block-face, and
include the additional metadata in the data structure.

5. The device of claim 1, where the one or more processors, when providing the parking information for display on the user interface of the user device, are to:
provide the parking information for display on the user interface to cause the user interface to display a number of available parking spaces for one or more block-faces in a threshold area around the user device.

6. The device of claim 1, where the one or more processors, when providing the parking information for display on the user interface of the user device, are to:
provide the parking information for display on the user interface to cause the user interface to display a colored representation of one or more block-faces in a threshold area around the user device,
where the colored representation of the one or more block-faces show a degree to which parking spaces are available in the threshold area around the user device.

7. The device of claim 1, where the one or more processors, when receiving the metadata for the portion of the first street segment, are to:
receive the metadata for the portion of the first street segment from one or more of:
a camera,
a sensor located at an intersection,
a vehicle sensor,
a sensor affixed to a drone, or
a weighting mechanism.

8. A non-transitory computer-readable medium storing instructions, the instructions comprising:
one or more instructions that, when executed by one or more processors, cause the one or more processors to:
receive parking information for a set of street segments within a geographic region,
the parking information including metadata for a set of parking spaces within the set of street segments, and
wherein the one or more instructions, that cause the one or more processors to receive the parking information for the set of street segments, cause the one or more processors to:
receive metadata for a portion of a first street segment, of the set of street segments, from a set of reporting devices, and
receive no metadata for another portion of the first street segment from the set of reporting devices;
create a set of block-face objects that represent block-faces within the set of street segments;

generate a data structure that associates the parking information for the set of street segments with the set of block-face objects;
execute a forecasting technique to determine metadata for the other portion of the first street segment for which no metadata was received;
use the data structure to associate the metadata for the portion of the first street segment and the metadata for the other portion of the first street segment for which no metadata was received with one or more block-face identifiers associated with the first street segment;
receive a request from a user device for parking information associated with a geographic area,
the request including at least one of:
location information identifying a location of the user device,
location information identifying a threshold area around the location of the user device,
location information identifying a destination location, or
location information identifying a threshold area around the destination location;
obtain the parking information associated with the geographic area by using location information included in the request to search the data structure; and
provide the parking information associated with the geographic area for display on a user interface of the user device.

9. The non-transitory computer-readable medium of claim 8, where the one or more instructions, that cause the one or more processors to generate the data structure that associates the parking information for the set of street segments with the set of block-face objects, cause the one or more processors to:
analyze the metadata for the set of parking spaces to create additional metadata,
the additional metadata including:
a metadata value indicating a total number of parking spaces associated with a particular block-face,
a metadata value indicating a total number of available parking spaces associated with a particular block-face, and
a metadata value indicating a utilization rate for a particular block-face, and
include the additional metadata in the data structure.

10. The non-transitory computer-readable medium of claim 8, where the one or more instructions, that cause the one or more processors to generating the data structure that associates the parking information for the set of street segments with the set of block-face objects, cause the one or more processors to:
execute a forecasting technique to determine additional metadata for the set of parking spaces, and
use the data structure to associate the additional metadata with one or more block-face objects; and
where the one or more instructions, that cause the one or more processors to provide the parking information for display on the user interface of the user device, cause the one or more processors to:
provide the parking information for display on the user interface,
the parking information including at least a portion of the additional metadata for the set of parking spaces.

11. The non-transitory computer-readable medium of claim 8, where the one or more instructions, that cause the one or more processors to obtain the parking information associated with the geographic area, cause the one or more processors to:
search the data structure using the location information included in the request to obtain the parking information associated with the geographic area,
the parking information including geographic coordinates for a particular available parking space; and
where the one or more instructions, that cause the one or more processors to provide the parking information for display on the user interface, cause the one or more processors to:
provide, based on the geographic coordinates for the particular available parking space, information relating to the particular available parking space for display on the user interface.

12. The non-transitory computer-readable medium of claim 8, where the one or more instructions, that cause the one or more processors to provide the parking information for display on the user interface of the user device, cause the one or more processors to:
provide the parking information for display on the user interface to cause the user interface to display at least one of:
a number of available parking spaces for one or more block-faces in a threshold area around the user device, or
a utilization rate for each block-face of the one or more block-faces.

13. The non-transitory computer-readable medium of claim 8, where the one or more instructions, that cause the one or more processors to provide the parking information for display on the user interface of the user device, cause the one or more processors to:
provide the parking information for display on the user interface to cause the user interface to display prediction information that identifies an area associated with a block-face that has a highest probability of having available parking.

14. A method, comprising:
receiving, by a device, parking information for a set of street segments within a geographic region,
the parking information including metadata for a set of parking spaces within the set of street segments, and
wherein receiving the parking information for the set of street segments, comprises:
receiving metadata for a portion of a first street segment, of the set of street segments, from a set of reporting devices, and
receiving no metadata for another portion of the first street segment from the set of reporting devices;
creating, by the device, a set of block-face objects that represent block-faces within the set of street segments;
generating, by the device, a data structure that associates the parking information for the set of street segments with the set of block-face objects;
executing, by the device, a forecasting technique to determine metadata for the other portion of the first street segment for which no metadata was received;
using, by the device, the data structure to associate the metadata for the portion of the first street segment and the metadata for the other portion of the first street segment for which no metadata was received with one or more block-face identifiers associated with the first street segment;

receiving, by the device, a request from a user device for parking information associated with a geographic area, the request including at least one of:
- location information identifying a location of the user device,
- location information identifying a threshold area around the location of the user device,
- location information identifying a destination location, or
- location information identifying a threshold area around the destination location;

obtaining, by the device, the parking information associated with the geographic area by using location information included in the request to search the data structure; and providing, by the device, the parking information associated with the geographic area for display on a user interface of the user device.

15. The method of claim 14, where receiving the request from the user device comprises:
- receiving the request from the user device,
  - the request including one or more user preferences;
- where obtaining the parking information comprises:
  - searching the data structure using the location information included in the request and the one or more user preferences to obtain the parking information associated with the geographic area; and
- where providing the parking information for display on the user interface comprises:
  - providing the parking information for display on the user interface,
    - where the parking information includes the one or more user preferences.

16. The method of claim 14, further comprising:
- executing, after creating the set of block-face objects, a forecasting technique to determine additional metadata for the set of street segments,
  - the additional metadata indicating a predicted number of available parking spaces for one or more street segments; and
- using, after generating the data structure, the data structure to associate the additional metadata with one or more block-face objects.

17. The method of claim 16, where providing the parking information associated with the geographic area for display on the user interface comprises:
- providing the parking information for display on the user interface,
  - the parking information including the additional metadata indicating the predicted number of available parking spaces.

18. The method of claim 14, where receiving the request from the user device comprises:
- receiving the request,
  - the request including a user preference to automatically select an available parking space;
- where obtaining the parking information associated with the geographic area comprises:
  - searching the data structure using the location information and the user preference included in the request to obtain the parking information associated with a particular available parking space; and
- where providing the parking information for display on the user interface comprises:
  - providing the parking information that identifies the particular available parking space for display on the user interface.

19. The method of claim 14, where providing the parking information for display on the user interface of the user device comprises:
- providing the parking information for display on the user interface to cause the user interface to display an indication that the user device has subscribed to one or more block-faces in a threshold area around the user device,
  - the user interface to display a notification when one or more parking spaces become available.

20. The method of claim 14, where providing the parking information for display on the user interface of the user device comprises:
- providing the parking information for display on the user interface to cause the user interface to display a number of available parking spaces for one or more block-faces in a threshold area around the user device.

* * * * *